United States Patent [19]

Witter

[11] 4,015,321
[45] Apr. 5, 1977

[54] WELDED PIPE FITTING AND METHOD OF MAKING SAME

[76] Inventor: Melvin L. Witter, 9553 Atherton, Dallas, Tex. 75231

[22] Filed: June 14, 1976

[21] Appl. No.: 695,815

Related U.S. Application Data

[63] Continuation-in-part of Ser. No. 535,283, Dec. 23, 1974, abandoned.

[52] U.S. Cl. .............................. 29/157 T; 285/158; 285/286
[51] Int. Cl.[2] ................... B21D 53/00; F16L 41/02
[58] Field of Search .................. 285/286, 189, 158; 29/157 T; 137/15

[56] References Cited

UNITED STATES PATENTS

| | | | |
|---|---|---|---|
| 2,006,139 | 6/1935 | Arthur | 285/158 |
| 2,496,677 | 2/1950 | Reedy | 285/286 X |
| 3,194,591 | 7/1965 | Weisend | 285/158 |
| 3,272,033 | 9/1966 | Leopold, Jr. et al. | 137/15 X |
| 3,516,692 | 6/1970 | Albrecht | 285/286 X |
| 3,520,561 | 7/1970 | Rinnger | 285/286 X |
| 3,799,182 | 3/1974 | Long | 137/15 |
| 3,894,757 | 7/1975 | Best | 285/189 |

*Primary Examiner*—Thomas F. Callaghan
*Attorney, Agent, or Firm*—Charles W. McHugh

[57] ABSTRACT

A threaded pipe fitting which is fabricated from two pieces of pipe or other cylindrical tubing or stock. The upper piece of pipe is relatively thick, so that pipe threads (either internal or external) may be machined therein without unduly weakening the fitting; also, a seat is provided at the other end of the thick pipe, typically by machining. The second piece of pipe has an outer diameter which is less than that of the first piece, but greater than the internal diameter of the first piece; that is, the two pieces cannot be telescoped with respect to each other, except for that small distance made possible by the step of machining said seat. The second piece of pipe will usually be much thinner than the first piece, too. The two pipe sections are assembled by physically engaging them in an end-to-end fashion, with an appropriately prepared end of the smaller pipe mating with the machined seat in the larger pipe. The two pipes are rigidly held together and sealed with at least one circumferential weld, which is preferably external. The free end of the smaller pipe has a radius or shape cut therein so that the fitting may fit flush against a run pipe or other structure, for being welded to same.

11 Claims, 10 Drawing Figures

WELDED PIPE FITTING AND METHOD OF MAKING SAME

This application is a continuation-in-part of application Ser. No. 535,283 filed Dec. 23, 1974 and now abandoned.

This invention relates generally to welding fittings of the type commonly used to create a T-joint in piping. More specifically, it relates to a fitting having internal (and frequently tapered) threads on its outlet end, which threads are adapted to engage the threads of a branch pipe.

There are many occasions when it is desirable to have a branch pipe intersect a structure such as another pipe (typically called a run pipe) or a pressure vessel, etc., wherein the branch pipe forms a common angle (e.g., 90°) with the wall of the major structure. One relatively early patent which describes such a fitting is U.S. Pat. No. 1,966,403 to Durham. The general configuration of a Durham fitting has remained relatively unchanged for many years, and fittings which are commerically available from various suppliers are similar to the one illustrated in FIG. 1. A fitting such as the one shown in FIG. 1 is typically forged, although some commercial fittings are machined from tubular shock. Whether such prior art fittings are forged or machined, they inherently have been characterized by having a fairly uniform and relatively thick wall—because of the need to provide sufficient material for the creation of internal (tapered) threads.

As might be expected, the relatively thick forging blanks and machining stock has meant that an appreciable quantity of metal was contained in each piece of raw material from which a fitting was manufactured. And, of course the quantity of metal in a fitting bears a fairly direct relationship to the manufacturing costs (and selling price) of a fitting. Thus, to reduce the quantity of steel in a fitting without really affecting the service rating of that fitting would obviously be a commendable achievement.

Too, there is another very practical reason for wanting to deviate from the traditional methods of producing bodies for fittings by either forging or machining. In certain inflationary times (characterized by a much greater demand for goods then can be matched by the available supply), there is a phenomenon of economics that tends to distort what would ordinarily be a closer matching of supply and demand. That is, when there is such a demand for goods that plants are operating at essentially 100 percent of capacity for an extended period of time, it is not too surprising that those products upon which a relatively high profit margin can be realized by a manufacturer will be scheduled for production and less profitable items will be deleted. When a fabricator is trying to ascertain exactly which items he should produce immediately and which items should be deferred, it is logical for him to look not only at orders in hand but also to rely on recent experience in an attempt to predict which items will be in demand in the near future. This anticipation of user's requirements is frequently hard to judge, since users tend to change their designs from time to time, and what was easily sold last year might not be in demand next year. Of course, a manufacturer can alway wait until he has firm orders for goods before he begins to produce them; but such a policy would inherently cause a delay between the time something is ordered and the time it can be shipped. In some cases, a supplier's ability to furnish goods on short notice can mean the difference between getting an order and not getting it. In the past, being able to quickly supply most anyone's needs in the line of pipe fittings has meant either achieving a very rapid production capability or maintaining an enormous inventory of fittings—including all of the myriad sizes of fittings which have been used from time to time. Both of these alternatives (enough machines to quickly produce parts or a large inventory of parts which have already been produced) are expensive. Hence, there has been a need for an alternative marketing solution in which a prospective purchaser looking for pipe fittings of a given size could be satisfied in a relatively short period of time, while the fabricator's capital investment in machines was not overly burdensome nor was his investment in inventory unduly large. It is therefore an object of this invention to provide a certain versatility and flexibility in the production of pipe fittings which has heretofore been unrealized.

Another object of the invention is to provide a manufacturer with the capability of promptly filling orders for unconventional fittings or fittings of a size that may be only rarely used—without the need to unduly disturb the production of more commonly used fittings by the same machine. A practical result of this facet of the invention is that a manufacturer can afford to occasionally produce some low-volume fittings—to a customer's order—that would otherwise be economically impractical. Hence, certain non-conventional fittings can be added to or kept in a manufacturer's product line without dictating a significant financial penalty to either the producer or the purchaser.

This new technique for manufacturing fittings also provides the advantage of reducing the demand for coupling stock from which many pipe fittings are commonly made. Such tubular stock for making pipe fittings is most notably distinguishable from more common pipe by virtue of its relatively thick wall. The amount of extra steel in a given length of coupling stock for pipe having a diameter of, say, four inches, in comparison with, say, schedule 40 steel pipe of that diameter can be readily appreciated when the weights of the two lengths are compared; thus, coupling stock of a given steel will typically weigh on the order of 21 pounds per foot, while standard 4 inch pipe of the same steel will weigh only about 11 pounds per linear foot.

While it is recognized that a certain quantity of thick-walled steel is essential in the fabrication of most any threaded fittings, it has now been discovered that a perfectly good fitting can be fabricated with a relatively small amount of the heavy and expensive thick-walled stock, when it is combined with an additional amount of lighter and less expensive pipe in those places where appreciable wall thickness is not so essential. This new design incorporates two cylindrical rings having different thicknesses and outer diameters, which rings are mated co-axialy (i.e., end-to-end) in a certain manner and then permanently joined (by welding) to create a composite structure having a bursting strength, etc., which can be essentially as good as fittings which are fabricated from a single piece of metal. Accordingly, it is still another object of this invention to provide a fitting for accommodating threaded pipe which can be fabricated in a manner which minimizes the amount of raw material required to make it.

A further reason for wanting a new, lighter fitting came into being when independent testing and certifying laboratories authorized the use of so-called "thin wall" pipe for use in fire protection service. As its name should suggest, thin wall pipe is significantly thinner than, say, schedule 40 or schedule 80 steel pipe. For example, thin wall pipe having a diameter of either 2½ inches, 3 inches or 3½ inches will have a wall thickness of 0.120 inch; and, thin wall pipe having a diameter within the range of 4 to 8 inches has a wall thickness of 0.188 inch. While such thin wall pipe has been rated as safe for pressures that may be found in a water sprinkler system in a building (i.e., up to 300 psi), the technique of securing branch pipes to run pipes using the old-style forged welding fittings has proved to be somewhat difficult. This is because a sound weld between a welding fitting and a run pipe is routinely accomplished by bringing the juncture between the two pieces of metal to a fusion temperature, such that there is molten metal at their juncture. If there is a great disparity in the thickness of the two pieces, the thinner piece will tend to overheat—and perhaps even melt—while a workman is still trying to impart sufficient heat to the thicker piece so as to bring it to a fusion temperture. Indeed, in many attempts to weld conventional welding outlets to thin wall pipe, there has been a tendency for the thin pipe to "burn through" by the time that a second or third pass of a welding torch is made. There has been a need, therefore, for a welding outlet which has a relatively thin base, such that it can be more easily heated and readily welded to thin wall pipes. Accordingly, it is an object of this invention to provide a welding outlet having a base which is structurally sound but which is thin enough to be easily welded to both conventional and thin wall pipe.

It is still another object to provide a fitting which uses a relatively small amount of expensive thick-wall tubing, whereby that quantity of thick-wall tubing which is used can be converted into more economical fittings than would otherwise be the case if the fittings were homogeneous.

These and other objects and advantages will be apparent from a reading of the specification and reference to the drawings in which.

Figure 1:
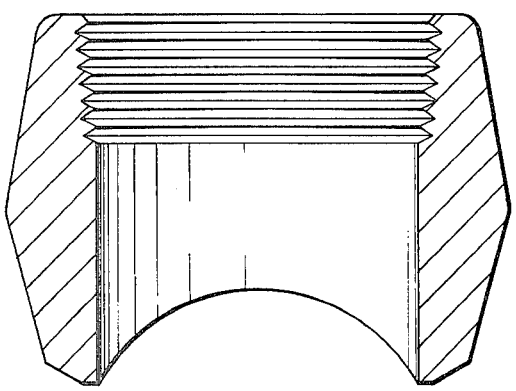
FIG. 1 is a cross-sectional, elevation view of a typical, prior art forged fitting.
Figure 2:
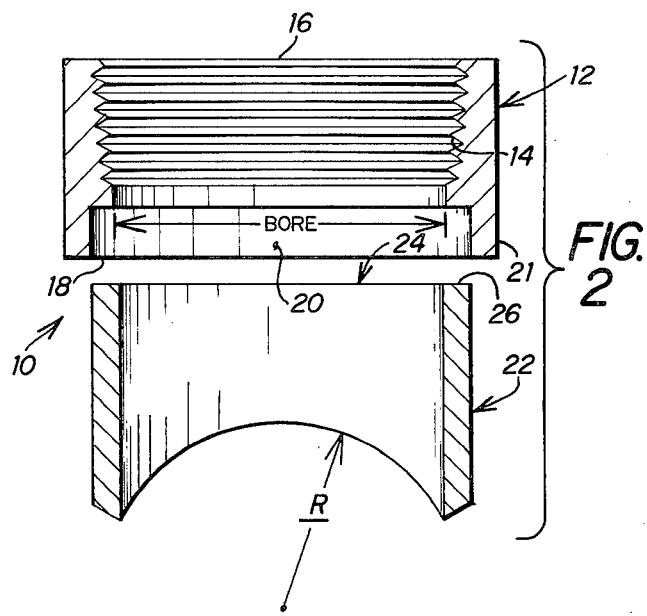
FIG. 2 is a cross-sectional, front elevation view of a fitting of the invention, with the body parts shown as they might be just prior to final assembly.

With initial reference to FIG. 2, a fitting 10 of the invention is shown in a dis-assembled condition, i.e., its two main parts are vertically separated by a small distance as they would normally be just prior to assembly. The two parts of the fitting 10 comprise a cylindrical ring 12 of relatively thick pipe or tubular stock. As with other tubes, pipes, rings and the like, it will be recognized that the element 12 has a generally uniform outer diameter and a bore of given diameter. The ring 12 is also provided with threads 14 which extend to a first end 16 in such a way that the ring 12 is adapted to receive a branch pipe or the like. The threads 14 in FIG. 2 are obviously shown as internal and tapered threads, but straight threads would probably be provided if the fitting is to be small, e.g., for 2 inch pipe or less. Too, if the fitting 10 is to be a commercial item having wide appeal, it is almost certain that the threads will be internal threads; but external threads might be desired by a customer for some special design, and the major steps for manufacturing a pipe fitting would be much the same for both internal and external threads. For either type of fitting, the ring 12 has a sufficient wall thickness so that threads may be provided therein without weakening the ring in an inordinate manner. For fittings 10 adapted to receive a 2 inch branch pipe, the initial wall thickness of the ring 12 should be at least ¼ inch, and a nominal size of 0.28 inch is preferred. For larger pipe sizes, larger wall thicknesses would be prudent; by way of example, a ring 12 for threadably receiving a 6 inch branch pipe will typically have an initial wall thickness of about ½ inch (e.g., 0.54 inch) before threads are cut therein.

The other end 18 of the ring 12 is machined (as by counterboring or the like) to provide a finished (i.e., smooth and regular) seat 20 which is aptly described as inwardly facing. That is, the seat 20 is finished such that it has a substantial surface that faces toward the bore rather than toward the exterior of the ring 12. As will be more clearly apparent hereinafter, the inwardly facing seat 20 is so oriented as to make possible the mating of the ring 12 with another element having a smaller diameter. Too, in FIG. 2 the ring 12 is illustrated as having an axis which is vertically oriented; with such an orientation, the seat 20 may also be described as being "downwardly facing". By virtue of this description, however, it is not intended to suggest the only orientation in which a commercial fitting might be installed. Rather, the reference to "up" or "down" in this specification should be understood to be for explanation purposes only, so as to have a frame of reference for thorough description of a fitting.

Shown below the ring 12 is a short piece of tubing or pipe 22 having a generally uniform outer diameter which is less than that of the cylindrical ring 12 but greater than that of the bore of said ring. It will be recognized in the drawing that the pipe section 22 is illustrated as being relatively thin—as compared with the ring 12. It is illustrated this way on purpose because the saving of raw material with which the fitting is fabricated, as well as the reduction of net weight of the completed fitting, is optimized when the pipe section 22 (which does not have threads in it) has a relatively thin wall. But, of course, the wall thickness of the pipe 22 will never be reduced to the extent that it cause the fitting to be so weak as to be unserviceable. The pipe section 22 may be made from standard, extra strong, or double extra strong pipe without really affecting the basic principles upon which the concept for the fitting is based.

The pipe 22 has one end 24 which is cut to provide a configuration which will closely match the configuration of the machined seat 20 when the two elements 12, 22 are engaged. While the precise thickness of a given piece of pipe 22 may be of little consequence, it is important that the outer diameter of the section 22 be less than the outer diameter of the ring 12. Only when this is so can an outwardly facing seat 26 on the end 24 be made to lie within the inwardly facing seat 20 of ring 12. This relationship between the two pieces 12, 22 is desirable so that when the pieces are engaged in an end-to-end fashion (i.e., with the end 24 of pipe section 22 mating with the machined seat 20 in the ring 12), a wall portion 21 of the ring will extend externally down over a portion of the pipe 22. When the two pieces 12, 22 are so engaged, relative motion between the two in a sideward direction will obviously be prevented and the pieces will be physically held so that their axes coincide.

The concept disclosed herein is likely to have its greatest utility with regard to pipe fittings for receiving branch pipes having diameters of at least two inches. For all practical purposes, then, the invention may be considered as being directed to fittings that are much larger than, say, fittings for water pipes in single-family residential houses, etc. And, as applied to fittings sized at, say, 2 inches or larger, the thickness of the pipe section 22 will be at least 0.15 inch. Exemplary wall thicknesses for various pipe sections 22 having the following diameters are: 3 inches diameter, 0.22 inch wall; 4 inches, 0.24 inch wall; 5 inches, 0.26 inch wall; and 6 inches, 0.28 inch wall.

Figure 3:
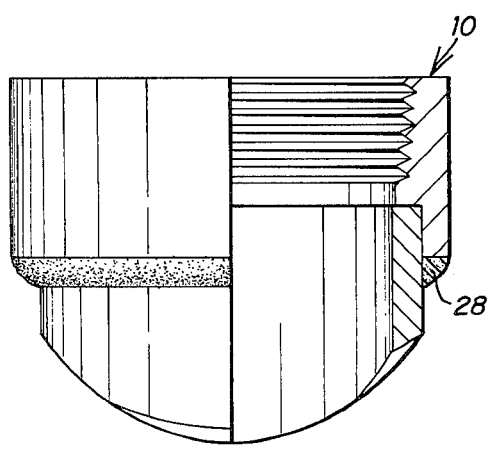
FIG. 3 is a partially sectioned side elevation view of a fitting in its assembled condition.
Figure 4:
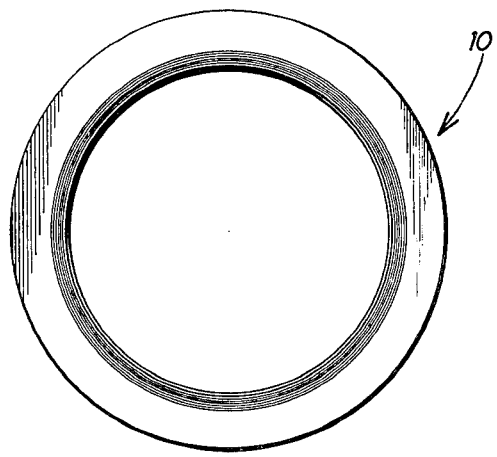
FIG. 4 is a top view of the fitting of FIG. 3.

In addition to being physically held against sideward movement, the ring and pipe are also rigidly held together with a circumferential weld 28, as shown in FIG. 3. The weld bead 28 ideally extends externally and completely around the juncture of the two elements 12, 22, so as to prevent relative motion between the two elements in an axial direction—as well as to seal the joint between the two pieces and to complete the body of the fitting 10. Naturally, the weld bead also serves to prevent rotation of the ring 12 with respect to the pipe 22, whereby a threaded pipe can be engaged at will with the threads 14.

Welding of the two pieces 12, 22 is preferably accomplished with an automated electrical-resistance welding machine, so that a single weld bead can extend 360° around the fitting in an uniform and consistent manner. That is, it is believed that welding of the two pieces 12, 22 to form an assembly can be more readily accomplished with a programmed machine than with manual welding. Such machines typically provide a uniform rate of relative motion between the pieces 12, 22 and a piece of welding rod, such that a very high-quality welded joint is routinely achieveable. And, of course, it is the high quality of the welded joint that will make feasible the substitution of a welded fitting of the invention for a homogeneous fitting of the prior art. To further increase the strength of the welded fitting, it would be practicable to add a second circumferential—but internal—weld bead on the inside of the fitting 10, at the interface between the two pieces 12, 22.

Figure 5:
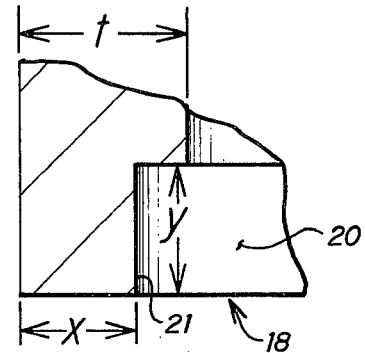
FIG. 5 is a fragmentary, sectioned view of a lower edge of the threaded cap of FIG. 2.

With reference next to FIG. 5, a portion of the lower end 18 of the threaded ring 12 is shown. The dimension $t$ obviously represents the wall thickness of the cylindrical ring 12, i.e., $t$ is one-half of the difference between the outer diameter and the bore of said ring. The dimension $x$ represents the thickness of that portion of the ring 12 which will overlap the upper portion of the pipe 22 when the two elements 12, 22 are engaged. This dimension $x$ should not approach zero, or else the advantages of improving the over-all strength of the assembly by incorporating a significant mechanical-type interlocking of the parts could be lost. Furthermore, the dimension $x$ should not approach the dimension $t$ too closely, or else the pipe 22 could be too easily canted or skewed as the two pieces 12, 22 are being assembled. Of course, if $x$ was made equal to $y$, then the piece 22 could telescope within the piece 12, and strict manufacturing controls would have to be implemented in order to obtain properly sized fittings. An optimum range of values for the dimension $x$ is believed to be between ½ to 3/4 of the dimension $t$. The preferred dimension for $x$ is about two-thirds of the wall thickness $t$.

The dimension $y$ is selected so as to provide at least some over-lapping of the two parts 12, 22 but not too much. To make the dimension $y$ too large causes the fitting to be heavier without any concomitant increase in over-all strength of the fitting. Another reason for keeping the dimension $y$ relatively short is to insure that the total length of the pipe fitting 10 will not be too long. For essentially all sizes of fittings, an optimum length for the dimension $y$ is about one-fourth inch.

As for the relative thickness of the ring 12 and the thin pipe section 22, it is not necessary for the thickest wall portion of the ring 12 to exceed the wall thickness of the thin section by a factor of more than about 2; indeed, the preferred relative difference between the two sections is achieved with a factor of about 1.8. By using such a factor, it will be possible to achieve a fitting 10 with adequate strength—and the thin pipe section 22 can be about the same diameter as the branch pipe that is to be subsequently threaded into the ring 12. For example, a ring 12 having an outer diameter of about 2¾ inch and an initial wall thickness of about 0.28 inch can be provided with a machined seat 20 so as to subsequently receive a short section of 2 inch pipe 22 having a wall thickness of about 0.15 inch. (The ratio of the thick wall section to the thin wall section is, of course, 1.8.) This same ring 12 can then be provided with internally tapered threads at its free end for receiving a branch pipe having a nominal diameter of 2 inches.

Figure 6:
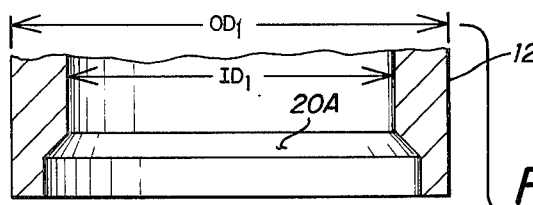
FIG. 6 is a diagrammatic representation (in expanded form) of another embodiment of the fitting which shows the relationship between the two major structural components of the body of a fitting.
Figure 6:
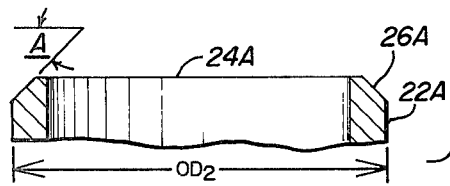
Figure 7:
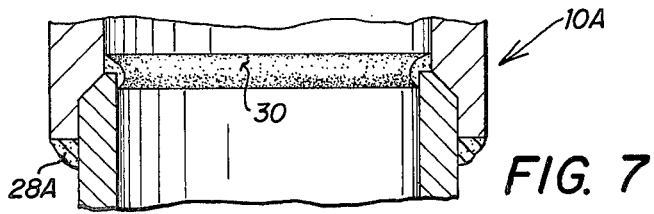
FIG. 7 is a diagrammatic representation of the elements of FIG. 6 shown in their assembled condition.
Figure 8:
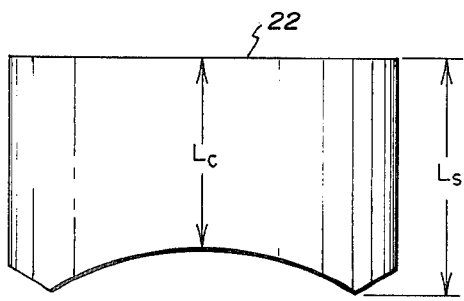
FIG. 8 is a side elevational view of a thin-wall portion of the fitting, showing the curvature of the bottom edge that fosters close contact with a round run pipe.
Figure 9:
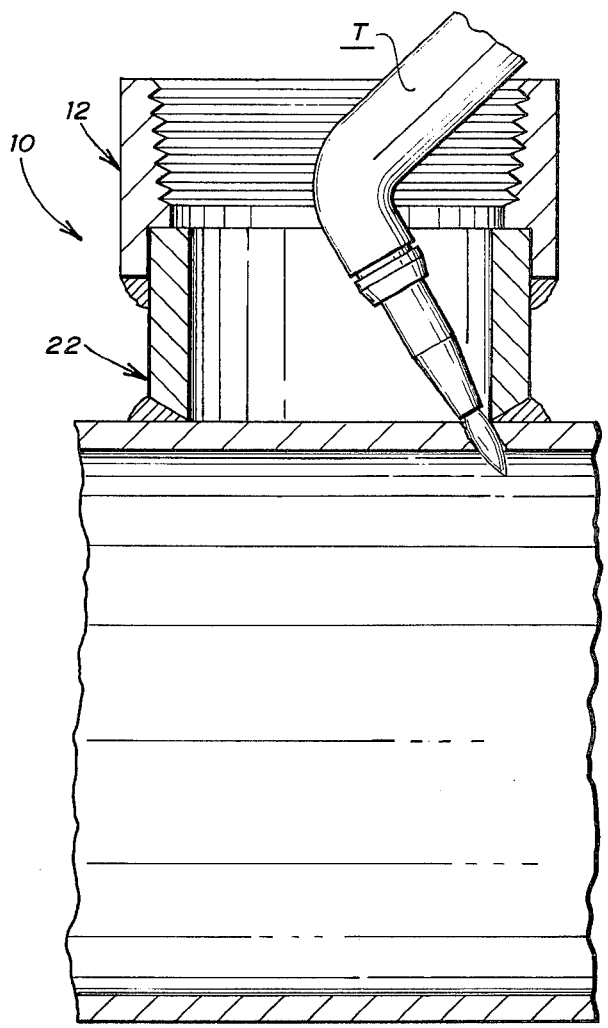
FIG. 9 is a longitudinal sectional elevation view showing the step of cutting a plug out of a run pipe after the fitting has been welded thereto.

With reference next to FIG. 6, another embodiment of the invention includes a different configuration for the inwardly facing seat 20A on a threaded cap 12A, which would obviously be engaged by an outwardly facing edge 26A on pipe 22A. That is, the angle A which establishes the slope of seat 20A would be similarly incorporated into face 26A, so that there would be uniform contact throughout the range of overlap—as shown in FIG. 7. As with the embodiment shown in FIG. 2, the outer diameter of the pipe section 22A should lie within the range of values established by the outer diameter and the inner diameter of the upper pipe 12. And, as before, the lower pipe or base 22A may be of significantly reduced thickness—as compared with the upper pipe or cap 12A. The diametral clearance between the pipe 22A and the seat in ring 12A should be on the order of 0.005 inch or less. While the embodiment of FIG. 6 should be recognized as falling within the scope of the appended claims, the square-shouldered seat and matching pipe end shown in FIG. 2 must be acknowledged to be the preferred embodiment of the invention—because of its manufacturing simplicity, if nothing else.

In all embodiments of the invention, the length of the thick ring 12 will be about the same as the length of the thin section 22. Of course, when the thin section 22 is contoured along its base so as to fit flush with a round pipe, it will actually have an irregular length; that is, the length measured along the crotch ($L_c$) will be less than the length along the skirt ($L_s$). In such a case, the average length of the thin piece 22 will be about the same as the length of the thick ring 12.

With reference now to the process of manufacturing the fittings, it is perhaps appropriate to give attention to the established market for fittings of the type disclosed herein. That is, there is a wide-spread demand for fittings which can be welded to a run pipe in order that branch pipes may be placed in communication with the run pipe. An example of the utility of such fittings can be found in most any installation of a water-sprinkler system for fire-control in a building. The fittings are ordered by specifying two dimensions, namely, the size of the pipe which is to serve as the branch pipe, and the size of the run pipe to which the fittings are to be welded. A typical fitting might be ordered as "2×8", which would indicate that a threaded (branch) pipe having a nominal diameter of two inches is to mate with the threaded end of the fitting, and the fitting will have a radius R (see FIG. 2) which would permit it to fit flush against the surface of an 8 inch pipe, where it would be subsequently welded. Because of the wide variety of run pipes and other structures to which a fitting could be welded, the radius R may vary from, say, less than one inch to as much as 10 inches. In the past, therefore, it has been the practice for major suppliers of fittings who pride themselves on fast delivery to maintain in their inventory an appreciable quantity of fittings covering not only the full commercial range of branch pipe sizes but also the full commercial range of run pipe sizes. With regard only to run pipe sizes, some manufacturers offer fittings to butt against run pipes from ⅜inch to 36 inches in diameter. Even though the threaded outlet size for a given fitting might be uniform (e.g., 2 inches), there was the necessity in the past to maintain a rather large quantity of finished fittings on hand because of the great diversity in sizes of run pipes. With this invention, the maintenance of such large inventories of finished fittings is made unnecessary, and all that need be kept in stock is an adequate quantity of threaded rings 12 and an appropriate quantity of various pipes 22, with the respective pipes havine appropriate ends for engaging certain run pipes.

The reduction of a manufacturer's inventory of expensive, finished fittings is made possible by virtue of the fact that the upper rings 12 for all fittings to accommodate a given size pipe will be the same. Therefore, a manufacturer who has rapid welding equipment on hand can quickly make a given fitting by selecting an appropriate base pipe 22 from his inventory, mechanically engaging the base and a ring 12 as described hereinabove, and then welding them together with an external and circumferential bead which seals the mechanical joint between the two pipes 12, 22; in a short period of time, then, a completely assembled fitting, ready for shipment to a customer, is fabricated. This contemplates, of course, that appropriate threads had already been provided on the relatively thick pipe section 12. However, such threads could readily be introduced as a final step in the manufacturing process rather than an intermediate step.

Since the bulk of the steel in a fitting of the invention will be found in the threaded cap 12 rather than the base pipe 22, a manufacturer can actually enlarge his capacity to fill orders but have on hand much less steel by stocking relatively few threaded caps 12 and an extremely large inventory of various pipes 22 with different radii R. Since the manufacturer has a less steel and labor tied up in a smooth pipe 22, he can afford to maintain an inventory of even those sizes which could be called "low volume" items. Thus, he can offer a customer fittings that might otherwise be economically impractical to stock, or which would involve an undesirable delay between the time of ordering and the time of delivery. Too, those skilled in the art will recognize that the cost of a set of dies for making a forged fitting of a particular size can be almost prohibitive—unless a relatively large quantity of fittings are to be produced with said dies. With this invention, there is no large expense involved in the making of dies which would have to be amortized over their service life. As compared with completely machined fittings, there is relatively little labor cost in the machining of the two confronting seats on the fittings 10; so the fittings disclosed herein can save time and money, too. Whether the process of this invention is compared with the prior art techniques of either forging or machining, it should be recognized that significant economies should be possible in practicing this invention.

In addition to the advantages that flow from the manufacturing processes for this new fitting, a very significant benefit is realized in the weight reduction that is accomplished. For example, a typical 4 inches forged fitting which is widely sold weighs about 8 pounds, and a comparable fitting made in accordance with this invention (having a burst strength in excess of 2000 p.s.i.) weights about 4.5 pounds. Since a typical water-sprinkler system for a building will be rated at about 300 p.s.i., the fittings of this invention will be more than adequate for fire-protection service (as well as many other uses), and the saving of weight throughout an entire installation should be considerable.

Of course, the fittings disclosed herein are not only lighter than one-piece fittings, they incorporate a relatively small amount of thick-wall stock for making the threaded rings 12.

By use of the terms "pipe fitting" or simply "fitting" herein, it is intended to refer to those articles of manufacture that are recognized by persons skilled in the art as "branch pipe fittings" and frequently referred to as "welding outlets". A welding outlet is typically made very short, so that the opening in the wall of the main pipe can be cut—through the mouth of the welding outlet—after the outlet has been welded to the main pipe. Such a technique makes unnecessary the use of templates or other means for marking the cut in the main pipe, prior to welding an outlet thereon. With an understanding, then, of what is referred to herein simply as a fitting, it should be apparent that the descriptive term "short" (as applied to the two sections of pipe that are employed to make up the fitting) would refer to pipe sections having a length appreciably less than one foot. Indeed, perhaps the largest manufacturer of welding pipe fittings in the U.S. advertises no fittings having a total length greater than approximately 6 inches. And, as explained elsewhere herein, it is anticipated that pipe fittings made in accordance with this invention for commercial use will be similar in length to previously known fittings, so that ready substitution of the new fittings can be effected by welders in the field without having to make unusual adjustments in cutting branch pipes, etc. It should be appreciated, therefore, that this invention is basically addressed to altering the style and weight of branch pipe fittings—not the length thereof.

Another advantage of the fittings 10 disclosed herein flows from the fact that the base of the fitting (i.e., the lower part of the section 22) will be appreciably thinner than previously known forged fittings, and this is especially significant when one considers some of the facets of welding a branch fitting to a run or header pipe. Experienced welders have found that the old-style forged fittings usually required more than one—and frequently three—complete circumferential passes of a welding apparatus in order to properly weld such a fitting to a header pipe. On the other hand, it has been found that a completely satisfactory weld can be obtained on the composite fitting 10 by making a single circumferential pass with the welding head. The reduced number of welding passes required by a fitting 10 offers several benefits. First, the benefit of making one pass instead of three provides obvious savings in welding material. A second advantage of making one pass compared with three is a savings of labor time. A third advantage is the saving of energy (either electrical or acetylene gas, etc.). But, perhaps much more important that the conservation of energy, time and welding materials is the fact that less heat is imparted to the header pipe by making a single pass—as compared with making three passes; and, heat added to a header pipe almost inevitably leads to distortion. If too much heat is added to a header pipe, a fitting which was properly oriented before the weld was started may turn out to be inclined with respect to the intended direction by several degrees. And, when it is necessary to place several fittings along a header pipe—as is typically required in the fabrication of a sprinkler system for fire protection service, any deviation from the intended orientation of the fittings will mean that the branch pipes which engage these fittings may have their distal ends separated by as much as a foot. (If a branch pipe is only 20 feet long, a vertical misalignment in the welded fitting of only 3° can put the free end of the pipe 1.047 feet above or below its intended plane.) Hence, any fitting that requires less heat to install will obviously tend to reduce the prospect of heat distortion in the header pipe.

Figure 10:
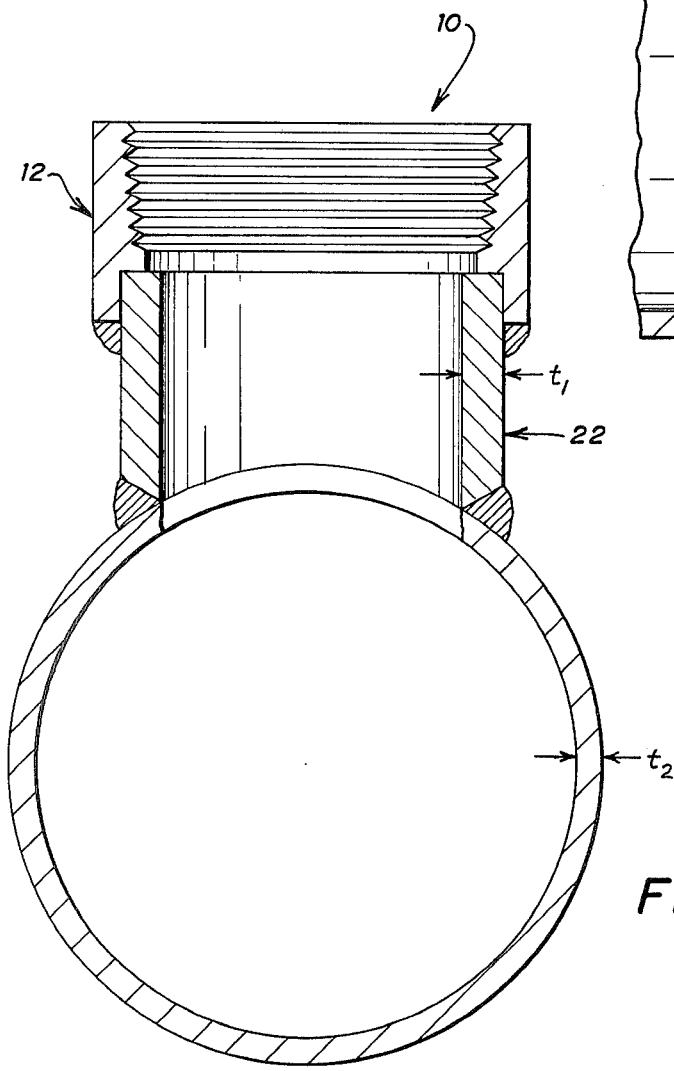
FIG. 10 is a transverse sectional view of a fitting of the invention welded to a thin-wall run pipe.

Additionally, it should be understood that a sound weld between a fitting and a header pipe is accomplished by brining the juncture between the two pieces of metal to a fusion temperature, such that there is molten metal at the juncture of the two pieces. It should also be appreciated that it is more difficult to weld a very thick piece to a thin piece than it is to weld together two thin pieces, because the thin piece will frequently overheat while the welder is still trying to impart sufficient heat to the thick piece to render its surface molten. As applied to the welding of nipple or T-type fittings to a header pipe, there is a common problem in trying to weld forged nipples (which are inherently thick and heavy at their base) to thinner pipes. And, in recent months, certain regulatory agencies have followed the lead of recognized testing laboratories (such as Underwriter's Laboratories) and have approved the use of so-called "thin wall" pipes in fire protection service. Such thin-wall pipe has a wall thickness of 0.120 inches for pipe sizes having a diameter of either 2½ inches, 3 inches or 3½ inches. Thin-wall pipe having a diameter of 4 inches to 8 inches has a wall thickness of 0.188 inch. In attempting to weld the old-style forged nipples to such thin wall pipe, it is common for the thin pipe to "burn through" by the time that the second or third pass of the welding head is made. On the other hand, a single pass made around a composite fitting 10 which is being welded to thin wall pipe will typically produce a sound weld without the "burn through" problem. No doubt this success in welding fittings of the type disclosed herein to thin wall pipe can be attributed to restricting the wall thickness of the pipe sections 22 to less than twice the thickness of the thin-wall run pipe. This restriction is illustrated in FIG. 10, wherein the wall thickness $t_1$ is greater than the wall thickness $t_2$—but not by more than 100%. In actual practice of the invention, a thin wall pipe will typically have a wall thickness $t_2$ no greater than about 0.20 inch, and the thickness of the thin pipe section 22 will be no more than about 0.30 inch.

While only the preferred embodiments of the invention have been disclosed in great detail herein, it will be apparent to those skilled in the art that modifications thereof can be made without departing from the spirit of the invention. Thus, the specific structures shown herein are intended to be exemplary and are not meant to be limiting, except as described in the claims appended hereto. For example, the diameter of the threaded ring 12 can be established to accommodate any size of threaded pipe. Too, the length of a particular section of base pipe 22 may be slightly increased or decreased as required to meet certain space requirements. The fitting illustrated in FIG. 3 is proportioned in a manner such that its total length would be the same as the length of a forged fitting which is designed to replace; and no doubt this would be the accepted commercial practice. But any combination whose length is such that it is truly considered to be a pipe fitting—as that term is understood in commercial practice—could still fall within the inventive concept as disclosed herein. Too, the free end of the base pipe 22 could be cut with a radius so as to produce a Y-joint or lateral joint as well as the aforementioned T-joint, without departing from the teachings herein. Thus, the angle which the installed fitting makes with a run pipe or other structure is not critical, and it may be altered as necessary to fit special requirements. These and other modifications are intended to be encompassed by the following claims.

What is claimed is:

1. A relatively light-weight branch pipe fitting having a first end contoured for welding to a main pipe and its other end having internal threads for receiving a branch pipe, comprising:
    a. a short section of relatively thick steel pipe having a generally uniform outer diameter and a bore of a given diameter, and said section having a first end with internal threads for receiving a branch pipe and its other end being counterbored to provide a finished seat, and the remaining wall alongside the counterbored portion having a residual thickness which lies within the range of about ¼ to ¾ of the original wall thickness, with the total length of said thick pipe section being not much more than that amount which is structurally required for providing threads to sealingly receive the end of a branch pipe;

b. a short piece of relatively thin steel pipe having a generally uniform outer diameter which is less than that of the thick pipe section but greater than the bore of said section, with a first end of the thin pipe being configured to engage the counterbored seat in the thick section and its free end being contoured so as to permit it to fit flush against a round main pipe for efficient welding thereto, with the length of the thin pipe being approximately the same as the length of the thick pipe; and c. the thick and thin pipes being engaged end-to-end with the first end of the thin pipe mating with the counterbored seat in the thick pipe, and there being a circumferential weld bead extending externally around the juncture of the two pipes to hold them rigidly together and to seal the fitting formed thereby, and the total length of the fitting being relatively short, whereby a cutting torch may be inserted internally of the fitting for cutting a hole in the main pipe after the fitting has been welded thereto.

2. The pipe fitting as claimed in claim 1 wherein the finished seat in the relatively thick pipe section comprises a socket-type seat having a substantially cylindrical surface and an annular surface which intersects said cylindrical surface and the bore, and wherein the piece of relatively thin pipe has a substantially flat end for abutting against the annular surface of the seat.

3. The pipe fitting as claimed in claim 1 wherein at least a portion of the wall of the thick pipe section overlaps the first end of the thin pipe for a distance of about one-fourth inch.

4. The branch pipe fitting as claimed in claim 1 wherein the thickest portion of the thick pipe section does not exceed the thickness of the thin piece of pipe by a factor of more than about two.

5. The branch pipe fitting as claimed in claim 1 wherein the outer diameter of the piece of thin pipe is at least 2 inches, and the wall thickness of said piece is at least 0.15 inch.

6. The branch pipe fitting as claimed in claim 1 wherein the outer diameter of the piece of thin pipe lies within the range of about 2 inches to 6 inches, and the total length of said fitting is no more than about 6 inches.

7. An article of manufacture identifiable as a branch pipe fitting, and having a first end adapted to be welded to a structure and having threads at its other end for engaging a pipe, comprising:

a. a short cylindrical ring of steel having a substantial thickness and having a generally uniform outer diameter and a bore of a given diameter, with said ring having a first end and having threads on over half of its length which are adapted to engage a single branch pipe, and its other end being machined to provide a finished seat;

b. a short piece of relatively thin steel pipe having an outer diameter less than that of the cylindrical ring but greater than the bore of said ring, with a first end of the pipe having a configuration to engage the machined seat in the ring and its second end being cut with a radius to fit flush with the exterior wall of a structure for being welded to same, and the edge of the second end being beveled to foster such welding;

c. the ring and the pipe being engaged in an end-to-end fashion, with the first end of the pipe mating with the machined seat of the ring in such a way that a portion of the ring extends externally down over the first end of the pipe for a distance of about ¼ inch so as to prevent relative motion between the two in a sideward direction when they are initially engaged but not yet permanently connected; and d. the ring and the pipe being rigidly held together with a circumferential weld adjacent the juncture of the two elements to prevent any relative motion between them and to seal the fitting formed thereby, and the total length of the fitting being sufficiently short that a cutting torch may be inserted within the fitting for cutting a hole in the structure after the fitting has been welded thereto, and the thinnest portion of the fitting being adjacent that end which is to be welded to the structure, whereby the mass of material which must be brought to a fusion temperature in order to obtain a sound weld is minimized.

8. The branch pipe fitting as claimed in claim 7 wherein the length of the cylindrical ring is about the same as the length of the thin pipe, and the assembled length of the two pieces is no more than about 6 inches.

9. The branch pipe fitting as claimed in claim 7 wherein the wall thickness of the piece of thin pipe is at least 0.15 inch but less than 0.30 inch.

10. The branch pipe fitting as claimed in claim 7 wherein the maximum thickness of the cylindrical ring is about twice the thickness of the thin piece of pipe, whereby the fitting is thick where threads are provided therein, and thin where it is welded to a structure.

11. The method of fabricating a branch pipe connection utilizing a threaded pipe fitting of the type which is welded to a structure in such a way that a threaded branch pipe may be engaged with the fitting so as to be placed in communication with the structure's interior, comprising the steps of:

a. forming an inwardly-facing machined seat of a given configuration in one end of a section of relatively thick pipe;

b. forming an outwardly-facing machined seat in one end of a section of relatively thin pipe, with the thin pipe having an outer diameter which is less than the thick pipe's outer diameter but greater than the thick pipe's inner diameter, and the outwardly facing seat having a configuration which matches that of the inwardly facing seat;

c. engaging the two sections of pipe by placing them in an end-to-end fashion wherein the two machined ends abut one another and a portion of the thick pipe overlaps at least a portion of the thin pipe;

d. welding the two pieces of pipe together with an external and circumferential bead which seals the mechanical joint and forms an assembled fitting;

e. forming pipe threads in the free end of the relatively thick pipe section along more than one-half of said section;

f. welding the assembled fitting to a structure in such a way that a threaded pipe may be engaged with the fitting, with said structure being thin wall pipe having a thickness no greater than about 0.20 inch, and the thickness of the fitting immediately adjacent said thin wall pipe being no more than about 0.30 inch, such that welding of the fitting to the structure involves welding together two elements whose thicknesses do not differ by more than 100%; and g. inserting a torch means internally of the fitting for making a hole in the structure after the fitting has been welded thereto, so as to place the fitting in communication with the structure's interior.

* * * * *